United States Patent
Huang

(10) Patent No.: US 11,060,655 B2
(45) Date of Patent: Jul. 13, 2021

(54) ADJUSTABLE STAND FOR MOBILE DEVICES

(71) Applicant: Autoland Scientech Co., Ltd., Taichung (TW)

(72) Inventor: Chung-Yi Huang, Taichung (TW)

(73) Assignee: Autoland Scientech Co., Ltd., Taichung (TW)

(*) Notice: Subject to any disclaimer, the term of this patent is extended or adjusted under 35 U.S.C. 154(b) by 0 days.

(21) Appl. No.: 16/595,622

(22) Filed: Oct. 8, 2019

(65) Prior Publication Data

US 2020/0116297 A1 Apr. 16, 2020

(30) Foreign Application Priority Data

Oct. 16, 2018 (TW) ................. 107213975

(51) Int. Cl.
*F16M 11/00* (2006.01)
*F16M 11/20* (2006.01)
*F16B 2/12* (2006.01)
*F16M 11/04* (2006.01)

(52) U.S. Cl.
CPC ........... *F16M 11/2021* (2013.01); *F16B 2/12* (2013.01); *F16M 11/041* (2013.01)

(58) Field of Classification Search
CPC ........... G06F 1/16; A45F 5/02; F16M 11/105; F16M 11/041; F16M 11/06; F16M 1/2021; H04M 1/04; F16B 2/12
See application file for complete search history.

(56) References Cited

U.S. PATENT DOCUMENTS

| 4,436,271 | A | * | 3/1984 | Manso | A47B 19/00 248/452 |
| 7,032,872 | B2 | * | 4/2006 | Sullivan | F16M 13/00 248/346.06 |
| 8,905,367 | B2 | * | 12/2014 | Bury | B60R 11/0241 248/316.4 |
| 9,062,818 | B2 | * | 6/2015 | Fan | F16B 2/12 |
| 2012/0273637 | A1 | * | 11/2012 | Huang | F16M 11/105 248/291.1 |
| 2017/0150812 | A1 | * | 6/2017 | Tomomatsu | G07G 1/0018 |
| 2019/0301665 | A1 | * | 10/2019 | Wu | G06F 21/88 |

* cited by examiner

*Primary Examiner* — Amy J. Sterling
(74) *Attorney, Agent, or Firm* — Alan D. Kamrath; Karin L. Williams; Mayer & Williams PC

(57) ABSTRACT

An adjustable stand for mobile devices includes a board-like body, and a first holding unit and a second holding unit. The first holding unit is movable between the upper end and the bottom end of the body. The second holding unit is movable between the left side and the right side of the body. Two lateral members are respectively connected to the left side and the right side of the body. A support includes a bar with two arms extending from two ends of the bar. Each arm has a connector and two connectors are pivotably connected to the left and right sides of the body. The bar can be put on a desk top. The mobile device is positioned by the first and second holding units.

7 Claims, 8 Drawing Sheets

ADJUSTABLE STAND FOR MOBILE DEVICES

BACKGROUND OF THE INVENTION

1. Fields of the Invention

The present invention relates to a stand for mobile devices, and more particularly, to an angle adjustable stand for mobile devices.

2. Descriptions of Related Art

There are different types of stands designed for support mobile devices to position the mobile devices at a desired angle for convenience of operation. Some of the stands include a pawl device that is designed to hold a smaller phone or a larger planar device. Most of the pawl device includes complicated structure which has a high manufacturing cost. Furthermore, the pawl device is cooperated with a spring to securely hold smaller and larger sized products, and the spring tends to reach its fatigue point. Once the spring fails, the stands cannot successfully hold phones or planar devices.

The present invention is intended to provide an angle adjustable stand for mobile devices, and the stand holds the mobile device of different sizes and does not have the drawbacks mentioned above.

SUMMARY OF THE INVENTION

The present invention relates to an adjustable stand for mobile devices, and comprises a body which has a first holding unit and a second holding unit installed thereto. The first holding unit is movable between the upper end of the body and the bottom end of the body. The second holding unit is movable between the left side of the body and the right side of the body. Two lateral members are respectively connected to the left side and the right side of the body. A support includes a bar with two arms extending from two ends of the bar. Each of the two bars has a connector extending therefrom. The two connectors are pivotably connected to the body. The bar is put on a desk top and the body is position at designed angle relative to the desk. The mobile device of different sizes can be positioned between the first and second holding units.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 2A shows a positioning assembly of the adjustable stand for mobile devices of the present invention;

DETAILED DESCRIPTION OF THE PREFERRED EMBODIMENT

Figure 1:
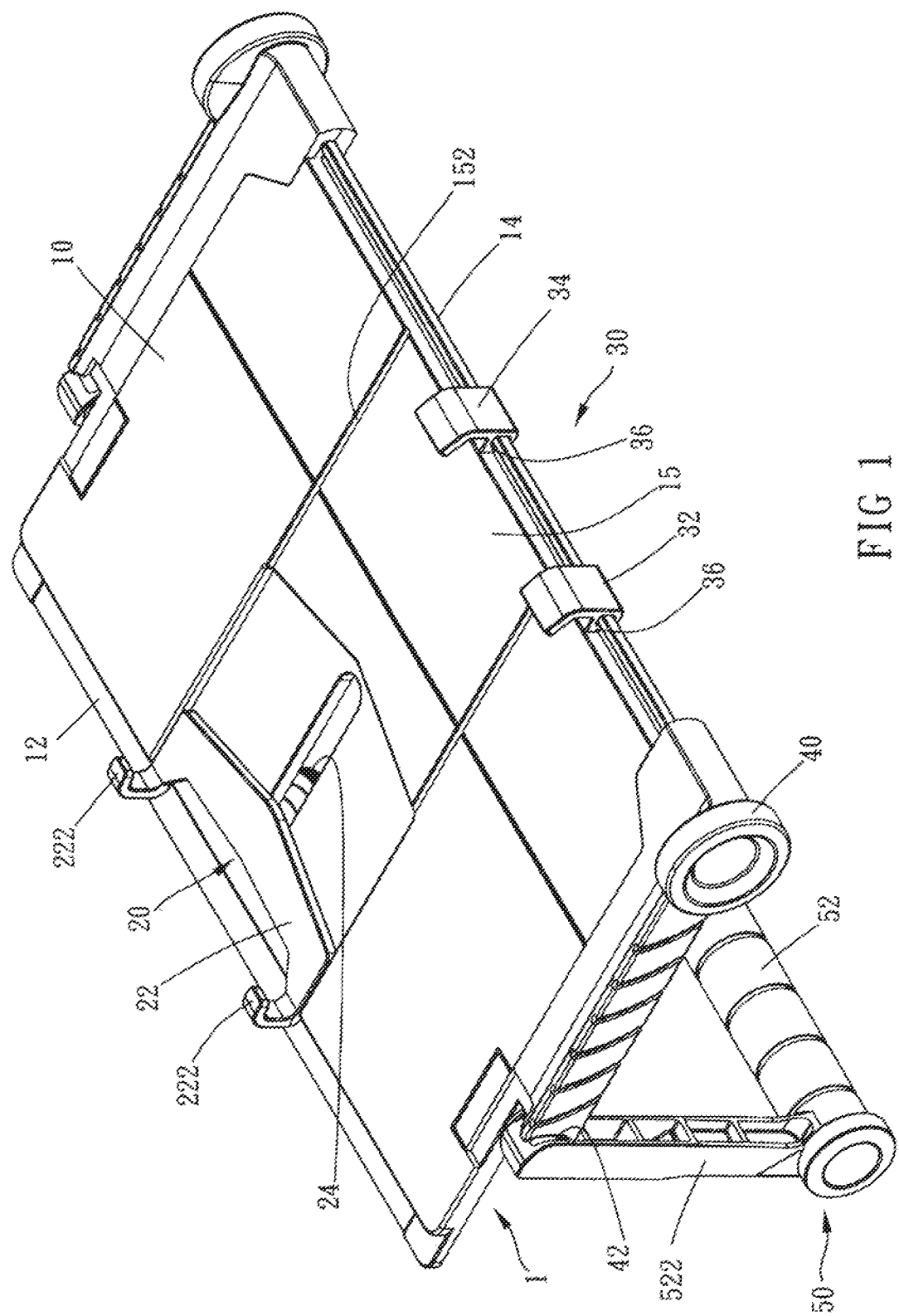
FIG. 1 is a perspective view to show the adjustable stand for mobile devices of the present invention.
Figure 2:
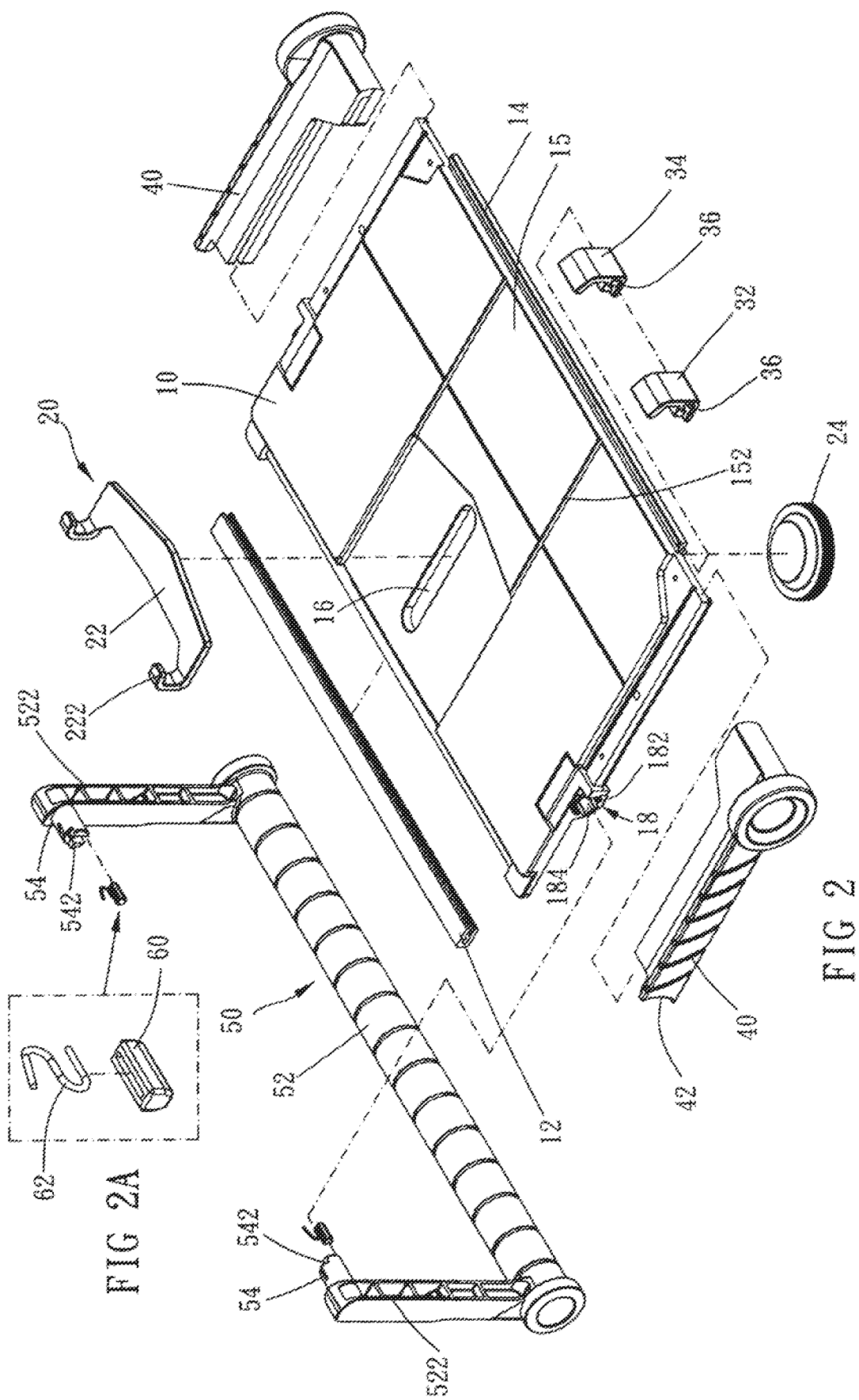
FIG. 2 is an exploded view of the adjustable stand for mobile devices of the present invention.
Figure 3:
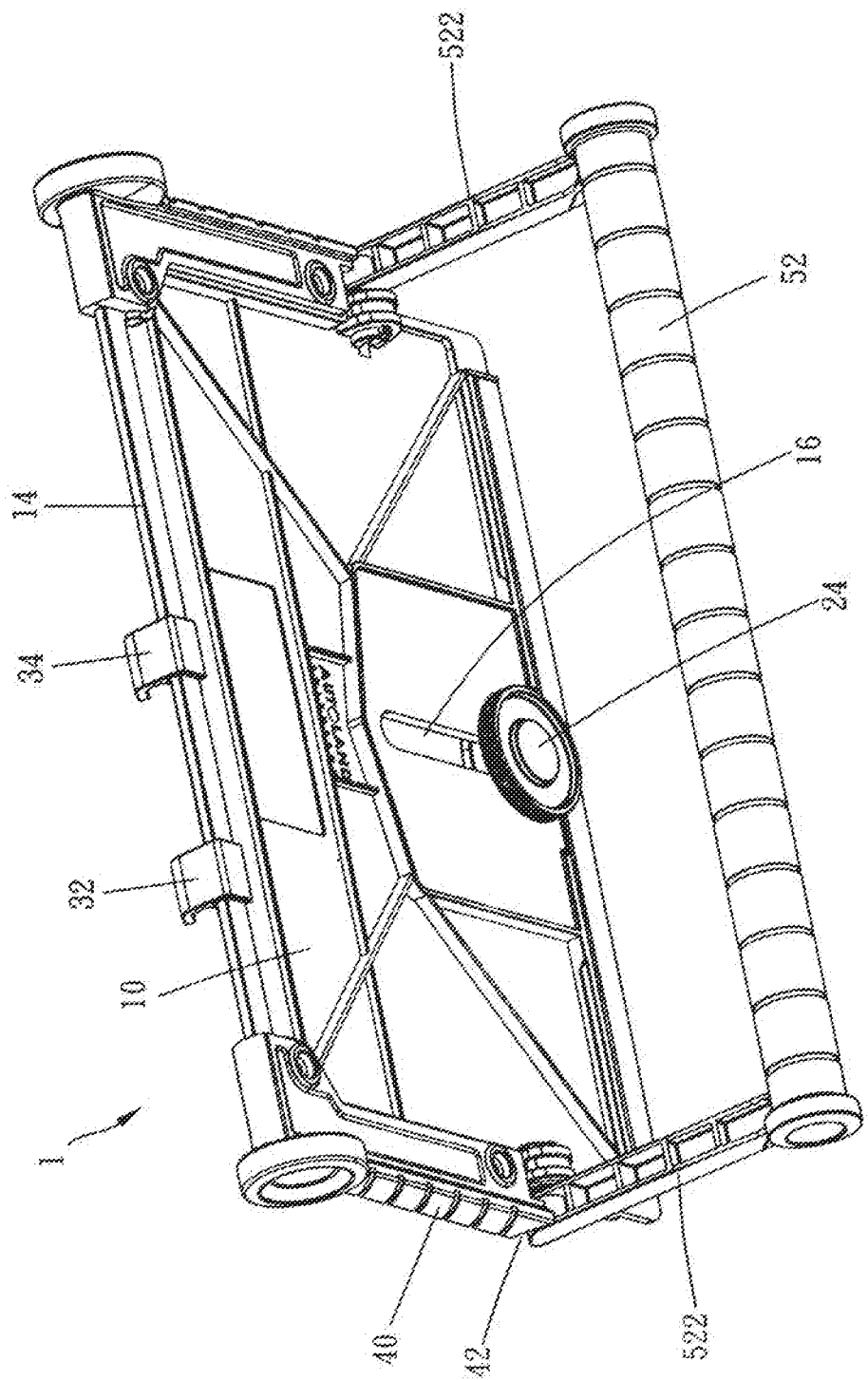
FIG. 3 is another perspective view to show the adjustable stand for mobile devices of the present invention.

Referring to FIGS. 1 to 6, the adjustable stand 1 for mobile devices of the present invention comprises a board-like body 10 which has a first holding unit 20 and a second holding unit 30 installed thereto. The first holding unit 20 is movable between the upper end of the body 10 and the bottom end of the body 10. The second holding unit 30 is movable between the left side of the body 10 and the right side of the body 10.

Two lateral members 40 are respectively connected to the left side and the right side of the body 10. Each of the two lateral members 40 includes a concaved face 42 formed to a distal end thereof. A support 50 includes a bar 52 with two arms 522 extending from two ends thereof. A connector 54 extends from each of the two arms 522 of the support 50. The two connectors 54 are pivotably connected to the body 10 so that the support 50 is positioned relative to the body 10, and the bar 52 is put on a desk top (not shown).

The body 10 includes a stop board 12 connected to the upper end thereof so as to prevent the first holding unit 20 from being separated from the body 10. The stop board 12 includes a U-shaped cross section and mounted to the upper end of the body 10. The body 10 includes a rail 14 connected to or formed to the bottom end thereof. The second holding unit 30 slides along the rail 14.

Figure 5:
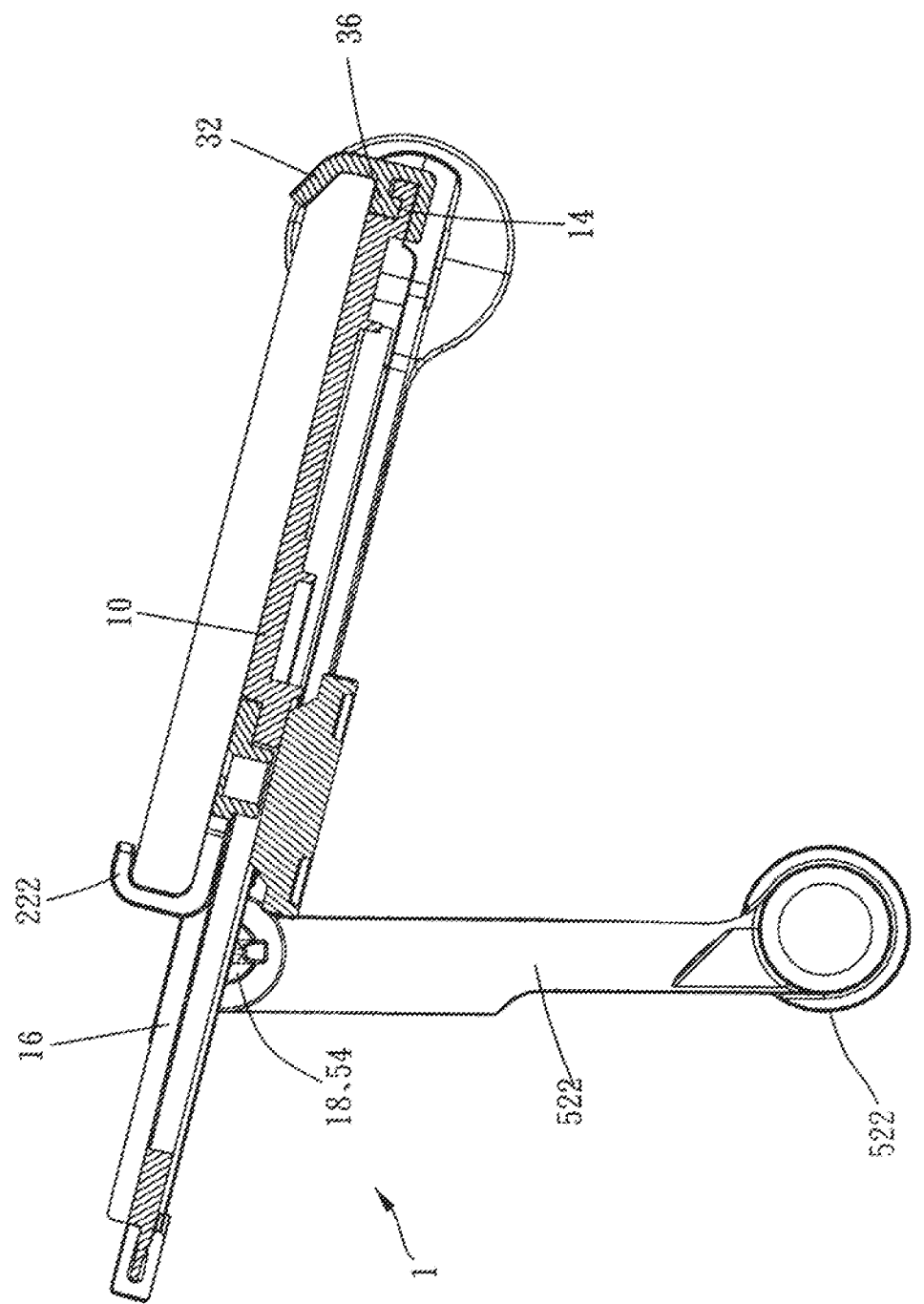

The body 10 further includes a recessed area 15 defined in the top surface thereof. The first holding unit 20 is movable within the recessed area 15 and is guided by the two inside walls 152 of the recessed area 15. Therefore, the first holding unit 20 is linearly movable by the guidance of the two inside walls 152 of the recessed area 15. The body 10 includes an elongate hole 16 defined therethrough, and the axis of the elongate hole 16 is perpendicular to the upper and bottom ends of the body 10. The first holding unit 20 includes a first part 22 and a second part 24. The second part 24 is located at the underside of the body 10, and the second part 24 extends through the elongate hole 16 and is connected to the first part 22 which is located on the top surface of the body 10. The first part 22 is movable along the elongate hole 16 and secured by the second part 24. Specifically, the first part 22 includes an elongate plate which includes two hooks 222 integrally extending from two ends thereof. The two hooks 222 are used to hold a mobile device as shown in FIG. 5.

The second holding unit 30 includes a left part 32 and a right part 34, wherein the left and right parts 32, 34 are slidable along the rail 14. Specifically, each of the left and right parts 32, 34 includes a hooking portion 36 to which the rail 14 is hooked so that the left and right parts 32, 34 can only slide along the rail 14 and cannot separate from the rail 14.

Figure 4:
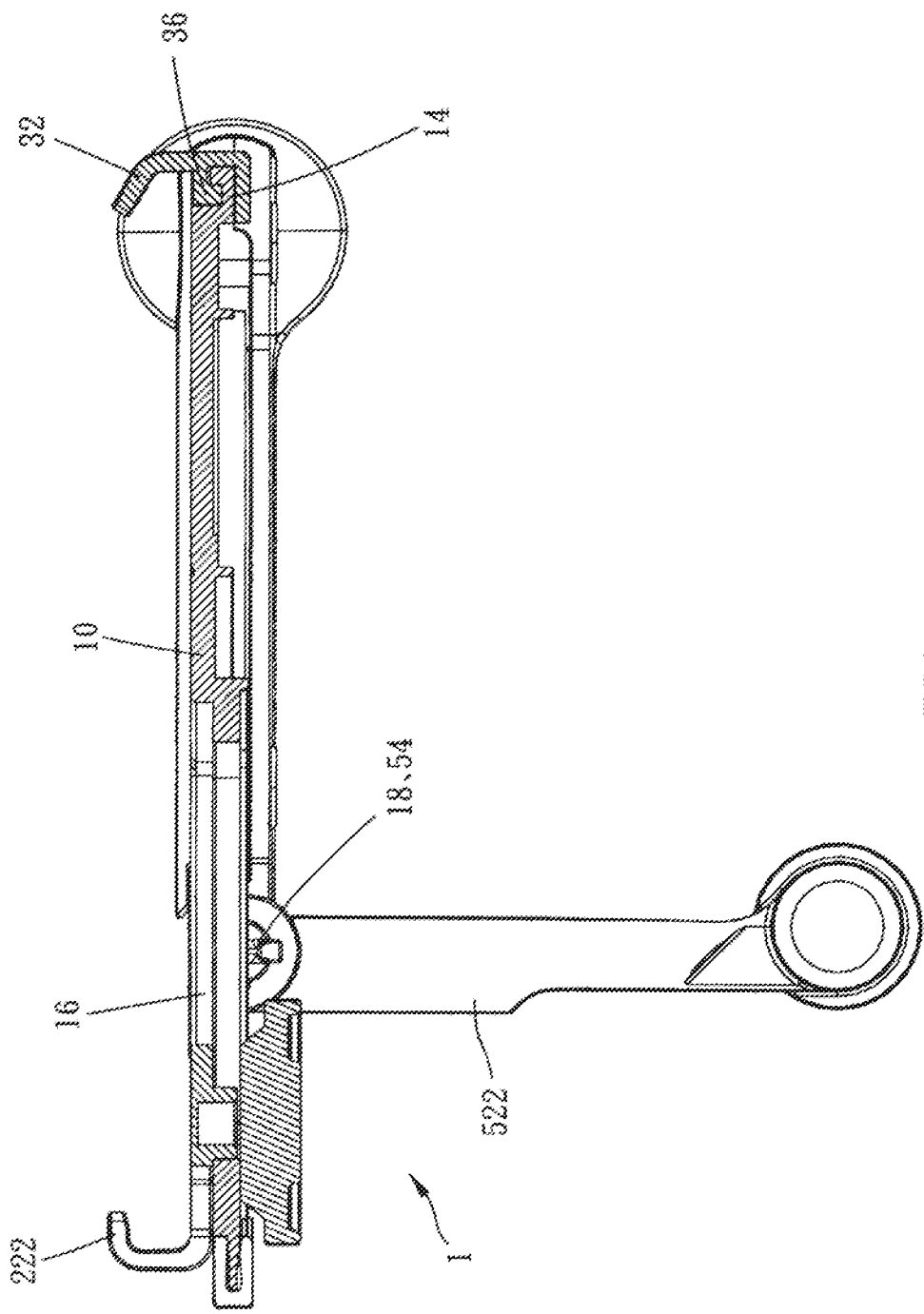
FIGS. 4 and 5 respectively show that the support is positioned at different angular position relative to the body.

The body 10 includes a lateral hole 18 defined in each of the left side and the right side thereof. Each lateral hole 18 includes a recess 184 defined in the inner periphery 182 of the lateral hole 18. Each connector 54 includes a tongue 542 extending therefrom which is inserted into the lateral hole 18 corresponding thereto, and the tongue 542 is movable between a first position and a second position in the recess 84. The tongue 542 is stopped by the two inside walls of the recess 184 at the first and the second positions. For example, the arms of the support 50 are perpendicular to the body 10 as shown in FIGS. 1 and 4 when the tongues 542 are at the first position. When the arms 522 of the support 50 are perpendicular to the body 10, a curved portion located beside the connector 54 of each of the two arms 522 is engaged with the concaved face 42 of the lateral member 40 corresponding thereto as shown in FIG. 1. Alternatively, the arms 522 of the support 50 are positioned at an angle less than 90 degrees relative to the body 10 as shown in FIG. 5 when the tongues 542 are at the second position.

Figure 6:
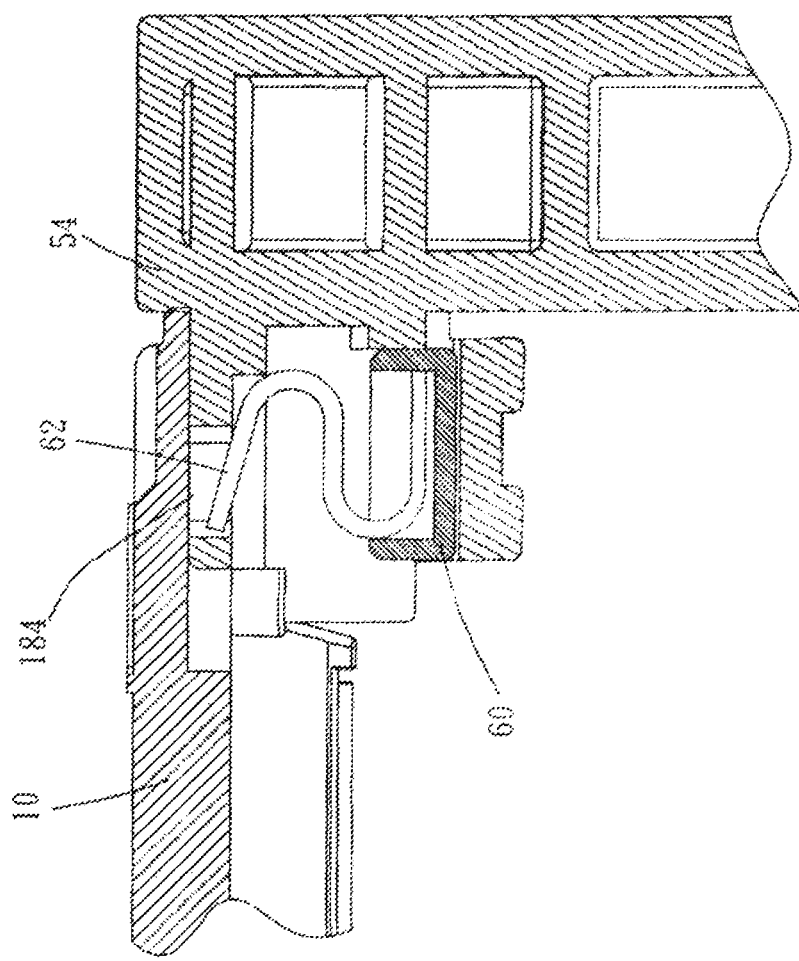
FIG. 6 is a cross sectional view to show that the positioning assembly is used between the connector of the support and the lateral hole of the body.

As shown in FIGS. 2A and 6, each of the connectors 54 includes a positioning unit connected thereto. The positioning unit includes a base 60 and a resilient member 62 which has a first end engaged with the base 60 and a second end of the resilient member 62 is movably biased against the inner end of the recess 184 so that the support 50 is positioned at any desired angle relative to the body 10.

Figure 7:
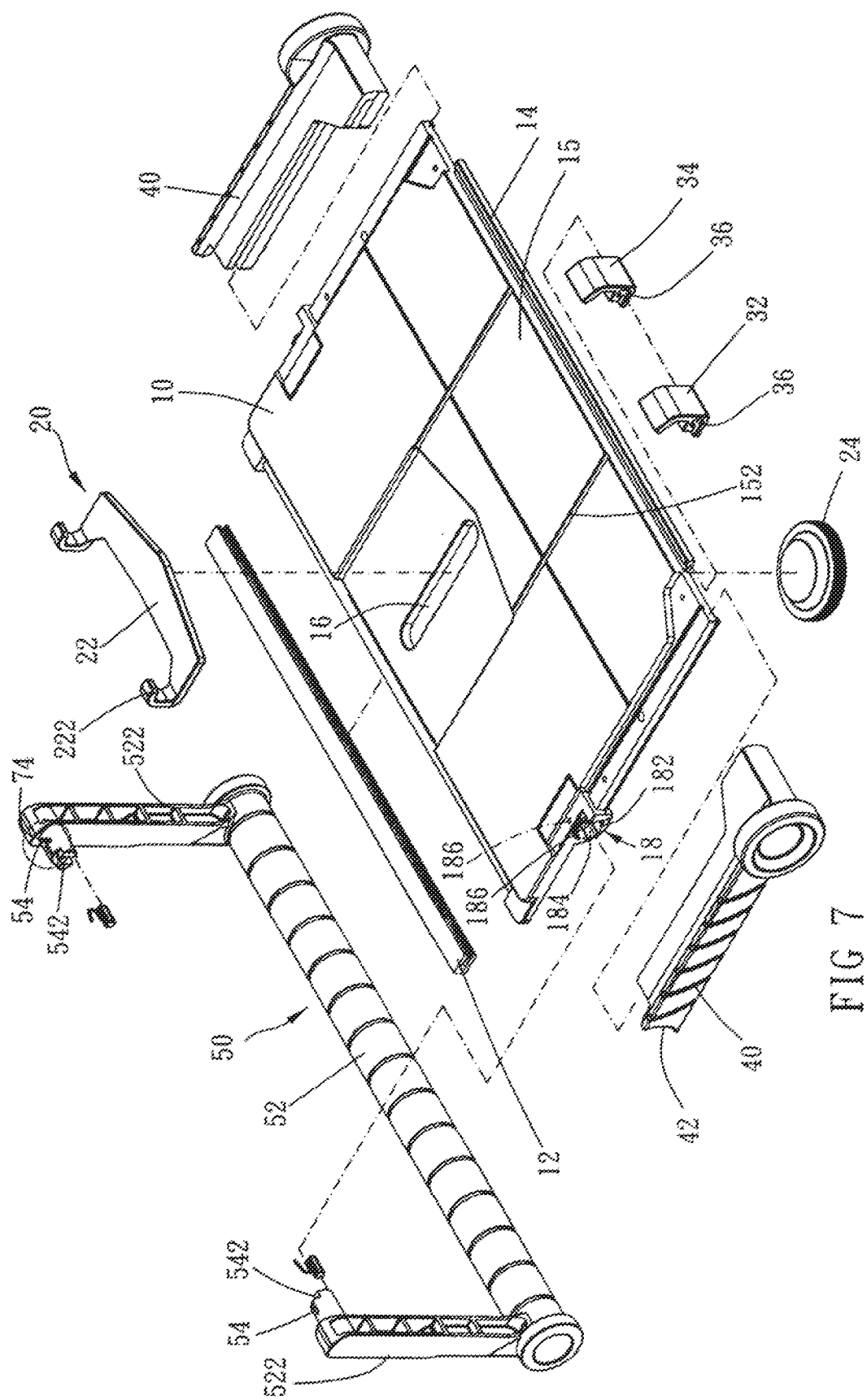
FIG. 7 is an exploded view of another embodiment of the adjustable stand for mobile devices of the present invention.
Figure 7B:
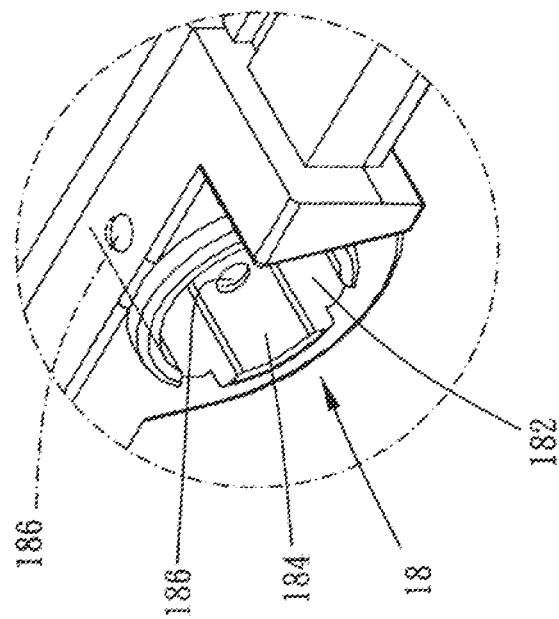
FIG. 7B is an enlarged view to show the lateral hole of the body.
Figure 7A:
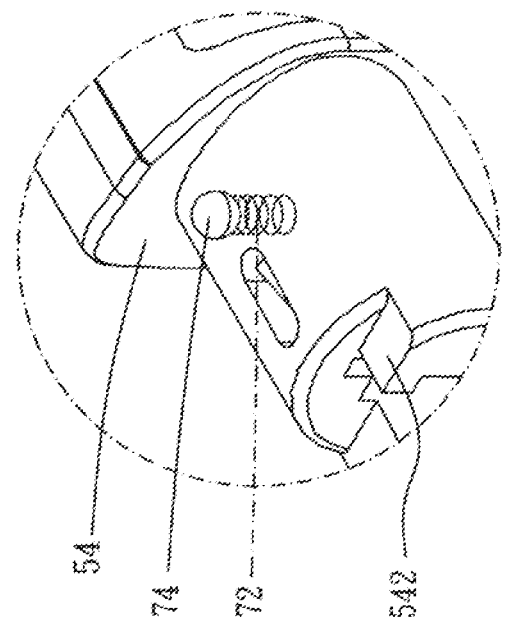
FIG. 7A is an enlarged view to show the connector of the support.

As shown in FIGS. 7A and 7B, each of the lateral holes 18 includes two notches 186 defined in the inner periphery 182 thereof. The positioning unit includes a spring 72 and a bead 74, the spring 72 is inserted in a bore of the connector 54 and biases the bead 74. The bead 72 is engaged with one of the notches 186 to position the connector 54 at the first position or the second position.

A mobile device as shown in FIG. 5 is held between the hooks 222 of the first holding unit 20 and the left and right parts 32, 34 of the second holding unit 30. The first holding unit 20 is movable along the elongate hole 16, and the left and right parts 32, 34 of the second holding unit 30 and movable along the rail 14, so that the mobile devices of different sizes can be used to the adjustable stand of the present invention.

While we have shown and described the embodiment in accordance with the present invention, it should be clear to those skilled in the art that further embodiments may be made without departing from the scope of the present invention.

What is claimed is:

1. An adjustable stand for mobile devices comprising:
   a body having a first holding unit and a second holding unit, the first holding unit movable between an upper end of the body and a bottom end of the body, the second holding unit movable between a left side of the body and a right side of the body;
   two lateral members respectively connected to the left side and the right side of the body, and
   a support having a bar with two arms extending from two ends of the bar, a connector extending from each of the two arms of the support, the bar adapted to be put on a desk top, the two connectors pivotably connected to the body.

2. The adjustable stand as claimed in claim 1, wherein the body includes a stop board connected thereto which prevents the first holding unit from being separated from the body, the body includes a rail along which the second holding unit slides.

3. The adjustable stand as claimed in claim 2, wherein the body includes an elongate hole defined therethrough, the first holding unit includes a first part and a second part, the second part is located at an underside of the body, the second part extends through the elongate hole and is connected to the first part which is located on a top side of the body, the first part is movable along the elongate hole and secured by the second part, the second holding unit includes a left part and a right part, the left and right parts slidable along the rail.

4. The adjustable stand as claimed in claim 1, wherein the body includes a lateral hole defined in each of the left side and the right side thereof, each lateral hole includes a recess defined in an inner periphery of the lateral hole, each connector includes a tongue extending therefrom which is inserted into the lateral hole corresponding thereto, the tongue is movable between a first position and a second position in the recess.

5. The adjustable stand as claimed in claim 4, wherein each of the connectors includes a positioning unit connected thereto, each of the lateral holes includes two notches defined in the inner periphery thereof, the positioning unit is engaged with one of the notches to position the connector at the first position or the second position.

6. The adjustable stand as claimed in claim 4, wherein each of the connectors includes a positioning unit connected thereto, each of the connectors includes a positioning unit connected thereto, the positioning unit includes a base and a resilient member which has a first end engaged with the base, a second end of the resilient member is movably biased against an inner end of the recess so that the support is positioned at any desired angle relative to the body.

7. The adjustable stand as claimed in claim 1, wherein the body includes a recessed area defined in a top surface thereof, the first holding unit is movable within the recessed area and is guided by two inside walls of the recessed area.

* * * * *